United States Patent [19]

Das et al.

[11] E Re. 30,330

[45] Reissued Jul. 8, 1980

[54] ALUMINUM PURIFICATION

[75] Inventors: Subodh K. Das, Natrona Heights; C. Norman Cochran, Oakmont; Richard A. Milito, Natrona; Robert M. Mazgaj; Walter W. Hill, both of Lower Burrell, all of Pa.

[73] Assignee: Aluminum Company of America, Pittsburgh, Pa.

[21] Appl. No.: 40,155

[22] Filed: May 17, 1979

Related U.S. Patent Documents

Reissue of:

[64] Patent No.: 4,115,215
Issued: Sep. 19, 1978
Appl. No.: 771,100
Filed: Feb. 23, 1977

U.S. Applications:

[63] Continuation-in-part of Ser. No. 725,482, Sep. 22, 1976, abandoned.

[51] Int. Cl.[2] ..... C25C 3/06

[52] U.S. Cl. ..... 204/67; 204/245

[58] Field of Search ..... 204/67, 245, 283, 285, 204/287

[56] References Cited

U.S. PATENT DOCUMENTS

| | | | |
|---|---|---|---|
| 2,539,743 | 1/1951 | Johnson | 204/67 |
| 2,905,613 | 9/1959 | Tomonari et al. | 204/243 R |
| 2,930,738 | 3/1960 | Roake et al. | 204/64 R |
| 3,677,926 | 7/1972 | Davis | 204/243 R |
| 3,798,140 | 3/1974 | Sullivan | 204/67 |

*Primary Examiner*—Howard S. Williams
*Attorney, Agent, or Firm*—Andrew Alexander

[57] ABSTRACT

A process for purifying aluminum alloys comprises providing molten aluminum alloy in a container having a porous wall therein capable of containing molten aluminum in the container and being permeable by the molten electrolyte. Aluminum is electrolytically transported through the porous wall to a cathode thereby substantially separating the aluminum from alloying constituents.

11 Claims, 2 Drawing Figures

ALUMINUM PURIFICATION

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 725,482, entitled "Aluminum Purification", filed Sept. 22, 1976 now abandoned.

INTRODUCTION

This invention relates to a method and apparatus for purifying aluminum alloys and more particularly to a method and apparatus for electrolytically purifying aluminum alloys such as aluminum-silicon type alloys.

Aluminum-silicon alloys have been conventionally prepared by adding to commercial grade aluminum a desired amount of silicon, normally prepared independently, consequently resulting in a relatively high priced aluminum alloy product. In other processes, the aluminum-silicon alloys are prepared directly from alumina-silica core. For example, Seth et al. U.S. Pat. No. 3,661,562 disclose that aluminum-silicon alloy can be prepared in a blast furnace wherein coke or other suitable carbonaceous material is fed into one reaction zone and a mixture of coke and alumina-silica ore is fed into a second reaction zone. Hot carbon monoxide gases produced by combustion of the coke are introduced into the second reaction for reducing the alumina-silica ore. However, such or similar methods of producing aluminum-silicon alloys often result in the alloy having very high silicon and iron contents which normally have to be reduced or lowered for the alloy to have commercially utility. One method of keeping the iron content low in such alloys is to use alumina-silica containing ores with low iron content. Another method involves the steps of lowering the iron content by physical beneficiation prior to the reduction process. However, because of the unfavorable economics and extra steps involved, it is preferred to start with an alumina-silica containing ore having a high iron content, which, of course, results in an alloy being high in silicon and iron as noted above and the need for purification thereof.

Purification of aluminum alloys using electrolytic cells is disclosed in the prior art. For example, Hoopes U.S. Pat. No. 673,364 discloses that if impure aluminum, in a melted state, is used as an anode in an electrolytic cell, especially one in which the electrolyte contains fused aluminum fluroride and a fluoride of a metal more electropositive than aluminum, pure aluminum will be deposited at the cathode and fluorine is set free at the anode when current is passed through the cell.

In another method of purifying aluminum-silicon alloys, Sullivan et al. in U.S. Pat. No. 3,798,140 disclose electrolytically producing aluminum and silicon from aluminum-silicon alloys using a NaCl, KCl and $AlCl_3$ or $AlF_3$ electrolyte. The aluminum-silicon alloy is provided as an anode in a perforated graphite anode crucible. A perforated graphite screen is provided around a cathode and around an alumina crucible to prevent any fine silicon liberated during the electrolysis from floating into the cathode department. However, production of purified aluminum in this process is limited by its effective current density which is only 150 to 200 amps/ft$^2$ in the chloride-fluoride electrolyte.

The present invention overcomes the problem in the prior art by separating aluminum from alloying constituents such as silicon and iron and the like in a highly economical manner.

SUMMARY OF THE INVENTION

An object of the present invention is to purify aluminum alloys.

Another object of the present invention is to purify aluminum alloys containing high levels of alloying constituents such as silicon, iron and the like.

Yet another object of the present invention is to provide an electrolytic method of purifying aluminum.

Yet another object of the present invention is to produce high purify aluminum.

And still another object of the present invention is to provide an apparatus suitable for electrolytic purification of aluminum alloys.

In accordance with these objectives, there is provided a process and apparatus for purifying aluminum alloys. In the method, molten aluminum alloy is provided in a container having a porous wall which has a maximum average pore size of 635 microns. The porous wall is permeable by molten electrolyte and impermeable by molten aluminum. Aluminum is electrolytically transported or transferred through the porous wall and through the electrolyte to a cathode thereby substantially separating the aluminum from its alloying constituents.

DETAILED DESCRIPTION OF THE PRESENT INVENTION

Aluminum alloy as referred to herein is an alloy containing typically not more than 99.9 wt. % aluminum. However, alloys which can be purified in accordance with the present invention can contain large amounts of impurities. For example, the aluminum alloys can contain as much as 50 wt. % Si. Also, the alloys can contain large amounts of Fe, for example, 20 wt. %. In addition, other alloying constituents normally associated with aluminum, e.g. Ti, can usually be removed in accordance with the present invention. Also, the alloying constituents can be reduced to a very low level. That is, the present invention can be useful in providing high purity aluminum, even when the starting material is relatively pure.

Figure 1:
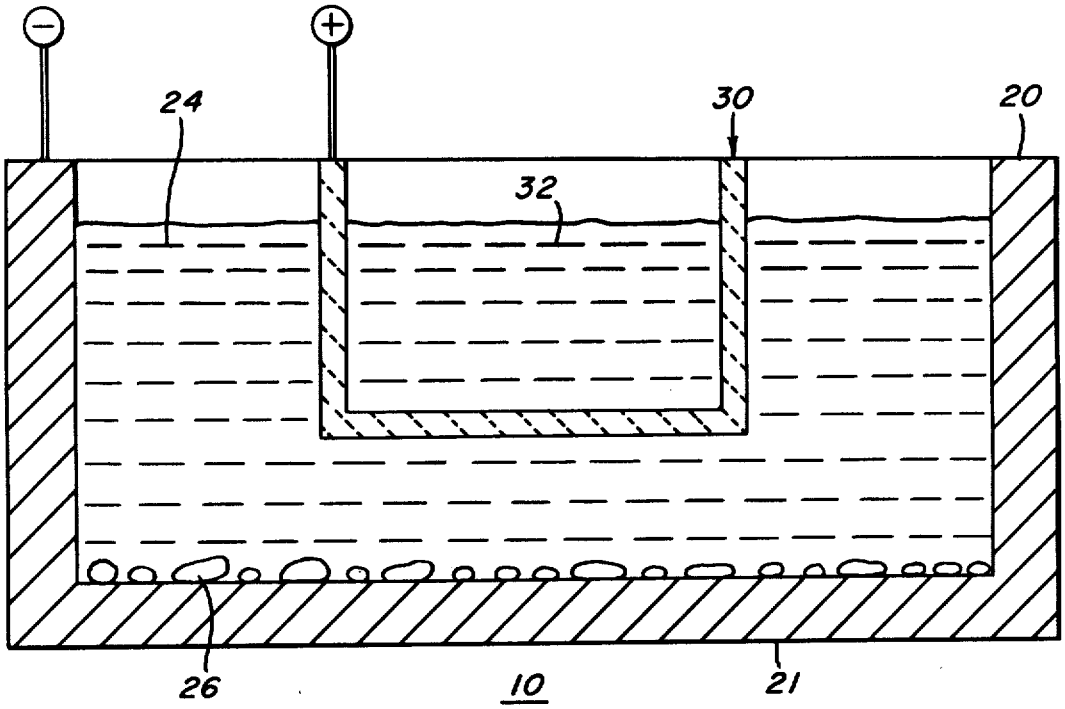
FIG. 1 shows in cross section a form of apparatus suitable for use in the present invention.

By reference to FIG. 1, there is shown an electrolytic cell configuration 10 in which an aluminum alloy can be purified substantially in accordance with the present invention. The cell comprises an outer container 20 which, at least a portion thereof, is constructed of graphite or a like material which can act as a cathode in the cell. For example, the cell may be constructed such that only bottom 21 or a portion thereof may serve as a cathode. Electrolytic cell 10 further comprises a second container 30 in communication with the cathode referred to by means of electrolyte 24. Container 30 serves as a vessel, as shown in FIG. 1, in which aluminum alloy 32 is provided in molten form. Container 30 should be constructed of a material resistant to attack by molten aluminum alloy 32 and electrolyte 24 and must have a wall or a portion of a wall thereof permeable or penetrable by an ion containing one or more aluminum atoms which can be electrolytically transferred or transported through the wall to the cathode.

Container 30 can be constructed from a conductive or non-conductive porous material. In container 30 is constructed from non-conductive porous material, an anode has to be projected into aluminum alloy 32 in order that the aluminum can be electrolytically transported to the cathode. If container 30 is made from a conductive, porous material, then the container can act as the anode as shown in FIG. 1.

With respect to the permeable wall, it is preferred that such material be a carbonaceous material when separation of constituents such as silicon, iron and the like from aluminum is desired. However, it is within the purview of the present invention to select other materials permeable by an ion containing one or more aluminum atoms but which restricts the passage of constituents such as those just mentioned. The preferred carbonaceous material suitable for use in the present invention is porous carbon or porous graphite having a maximum average pore diameter of 635 microns. An average pore diameter in the range of 5 to 425 microns can be used, with a preferred diameter being in the range of 20 to 220 microns. Porous carbon, obtainable from Union Carbide Corporation, Carbon Products Division, Niagara Falls, New York, and referred to as PC-25 having an effective porosity of about 48% and an average pore diameter of about 120 microns has been found to be quite suitable. Porous carbon or other porous material used in this application is further characterized by being impenetrable or impermeable to molten aluminum and alloying constituents thereof in the absence of electric current being passed through the cell but permeable by molten salt used as the electrolyte.

With respect to the pore size, it should be noted that its size can vary depending on the amount of head, the temperature of the molten aluminum, and the wettability of the porous member. Also, the electrolyte employed as well as the alloying constituents can affect the size of the pore which will be impenetrable or impervious to molten aluminum and alloying constituents thereof in the absence of electric current being passed through the cell. Thus it will be seen that in certain instances porous members having pores therein having a larger maximum pore diameter or having an average pore diameter larger than that indicated in the range above can be used in the instant invention and will be impermeable to the molten aluminum.

Electrolyte 24 is an important aspect of the present invention. The electrolyte should comprise an aluminum fluoride or chloride and at least one salt selected from the group consisting of lithium, potassium, sodium, manganese and magnesium halide with a preferred electrolyte comprising aluminum fluoride, lithium chloride and potassium chloride. The use of lithium chloride permits the use of high current densities without adversely affecting the operation of the cell as by heat generation due to high resistance encountered in the electrolyte. The potassium chloride aids in the coalescence of purified aluminum 26 deposited at the cathode. That is, when lithium chloride is used without potassium chloride, aluminum deposited at the cathode can remain in divided particle form making its recovery from the cell difficult.

The electrolyte can comprise, by weight percent, 5 to 95% LiCl, 4 to 70% KCl and 1 to 25% $AlF_3$. Preferably, the composition is 38 to 90% LiCl, 8 to 50% KCl and 2 to 12% $AlF_3$. $AlCl_3$ or $MgCl_2$ can be used instead of $AlF_3$; NaCl can be used instead of KCl; and LiF can be used instead of LiCl but on a less preferred basis. It will be appreciated that combinations of the above salts can also be used but again on a less preferred basis.

The temperature of the electrolyte can affect the overall economics of the process. If the electrolyte temperature is too low, the purified aluminum can be difficult to collect. Also, low temperatures can result in low electrolyte conductivity and consequently low cell productivity. Too high operating temperatures can diminish the useful life of the anode and cathode as well as cause vaporization of the salt. Thus, while the temperature can range from 675° to 925° C., a preferred temperature is in the range of 700° to 850° C.

In the process of the present invention, the cell can be operated at high current densities resulting in high yields of purified aluminum. Also, the cell can be operated at high current densities without encountering high resistances in the electrolyte and the resulting generation of undesirable heat and its attendant problems. The cell can be operated at a voltage of 1 to 5 volts and a current density in the range of 200 to 3000 amps/$ft^2$, or in certain cases higher, with a preferred voltage being in the range of 1.5 to 4.5 volts and a minimum current density which should not be less than 200 amps/$ft^2$ and preferably at least 300 amps/$ft^2$.

In operation of the electrolytic cell, molten electrolyte 24 is provided in container 20 and preferably kept at a temperature in the range of 700° to 850° C. Aluminum alloy in molten form is placed in container 30. An electrical current is passed from the anode to the cathode and aluminum is transported by virtue of the electrolyte through the porous carbon to the cathode where it is deposited and collected. The porous wall restricts the passage of alloying constituents such as silicon and iron and other residues and hence prevents the contamination of the purified aluminum under these operating conditions. If container 30 is constructed from a conductive, porous material, purified aluminum 26 should not be permitted to accumulate in container 20 until it touches container 30 since this would short-circuit the cell.

It will be appreciated by those skilled in the art that a number of anode containers, such as shown in FIG. 1, may be positioned within the cathode or outer container 20 to increase the production of the cell. Also, it will be appreciated that other configurations employing the permeable membrane may be used. For example, container 20 may be constructed from a non-conductive material and the porous membrane may be used to divide the container, providing an area to contain the impure molten aluminum 32 and another area or space in which to provide the electrolyte. The aluminum may be purified by providing an anode in the impure aluminum and a cathode in the electrolyte and passing electric current therebetween.

Figure 2:
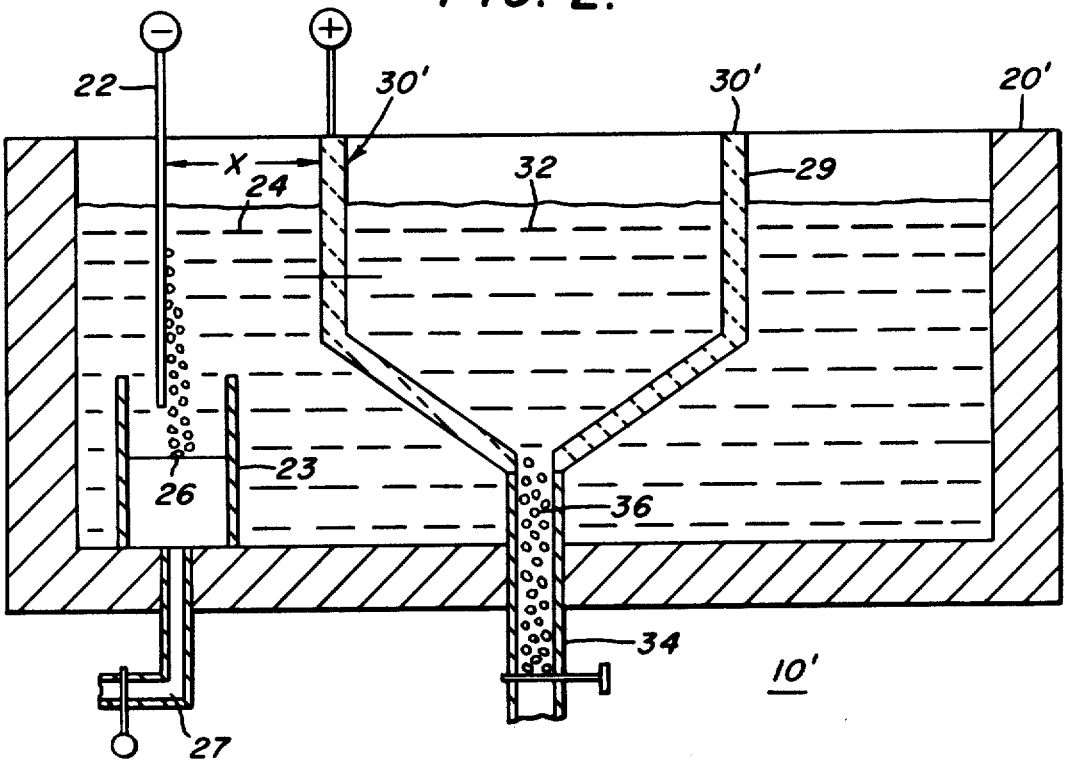
FIG. 2 is a schematic of an apparatus which can be operated on a continuous basis to provide purified aluminum.

By reference to FIG. 2, there is shown an alternate embodiment of the electrolytic cell which can be operated on a continuous basis. The cell 10' comprises outer container 20' constructed of a material resistant to attack by purified aluminum 26 or molten electrolyte 24 and a second container 30' which serves as a vessel in which aluminum alloy 32 is provided in molten form. The cell has a cathode 22 which projects into electrolyte 24. Underneath cathode 22, a receptacle 23 is positioned to receive purified aluminum 26 precipitated or deposited at the cathode. Receptacle 23 has an outlet 27 through which purified aluminum 26 can be removed continuously at a rate substantially commensurate with the rate of deposition thereof at cathode 22. Container 30', in the embodiment illustrated in FIG. 2, has a porous wall 29 permeable or penetrable by an ion containing one or more aluminum atoms which can be electrolytically transported through wall 29 to the cathode. An outlet 34 is provided so that residues or alloying constituents 36 remaining after aluminum has been separated therefrom can be removed. In the particular embodiment illustrated in FIG. 2, side 29 of container 30' serves as the anode of the cell.

In the cell of the present invention, the distance "x" (shown in FIG. 2) between the anode and cathode should be closely controlled in order to aid in minimizing the voltage drop across the cell. Thus, the distance "x" between the cathode and anode should not be more than 1.0 inch and preferably not more than 0.5 inch.

The present invention is advantageous in removing silicon and iron and the like in aluminum alloys to a very low level. In addition, the present invention is capable of separating magnesium and the like from aluminum. That is, if an aluminum alloy to be purified contains magnesium or the like, i.e. less noble than aluminum, such materials can pass through the porous membrane but are not normally deposited at the cathode. Magnesium and the like are normally dissolved in the bath and thus, in this way, can be prevented from contaminating the purified aluminum deposited at the cathode.

The present invention, as well as providing purified aluminum, is advantageous in that it can be provide high purity silicon. In addition, ferro-silicon compounds can be recovered since these materials do not pass through the porous membrane. Furthermore, while it has been noted hereinabove that the invention was particularly useful with respect to purifying aluminum alloys obtained from the high silicon ores, it is also useful in purifying aluminum scrap containing iron and silicon materials. Also, the invention can be used to purify aluminum used in clad products, e.g. brazing alloy.

The following examples are still further illustrative of the invention.

EXAMPLE I

An aluminum alloy containing 11.4 wt. % silicon and 0.21 wt. % iron was provided in molten form in an anode section of a cell. A molten electrolyte consisting of 5 wt. % aluminum fluoride and 95% lithium chloride was used. The electrolyte temperature was 750° C. The anode section was fabricated from porous carbon having an average pore diameter of 120 microns and a porosity of 48%. The distance between the anode and cathode was 0.4 inch. An electric current, amperage 125 and voltage 4.2 at a current density of 650 amps/ft$^2$ was passed across the cell. Purified aluminum collected at the cathode contained only 0.011 wt. % silicon and 0.05 wt. % iron.

EXAMPLE II

The aluminum alloy of Example I was purified as in Example I except the electrolyte contained 5 wt. % $AlF_3$, 10 wt. % KCl and 85 wt. % LiCl. The cell was operated at 4.2 volts and a current density of about 700 amps/ft$^2$. The purified aluminum collected at the cathode contained 0.009 wt. % Si and 0.015 wt. % Fe.

EXAMPLE III

A clad product having a core of aluminum alloy 3105 (0.5% Mn, 0.5% Mg, remainder essentially Al) and a cladding on both sides thereof (composition being 9.75% Si, 1.5% Mg, remainder essentially Al) was melted to provide an aluminum alloy composition having 3.10% Si, 0.45% Fe, 0.11% Cu, 0.16% Mn and 0.56% Mg. For purposes of purification, the melt was provided in an anode section and treated as in Example I except the electrolyte composition was 10% $AlF_3$ and 90% LiCl and the current density was 500 amps/ft$^2$. Analysis of the purified aluminum showed only 0.002% Si, 0.004% Fe, 0.001% Cu, 0.004% Mn and 0.0003% Mg, thus providing substantially 99.99% aluminum.

From the above examples, it can be seen that silicon and iron content of the aluminum were reduced rather significantly. Further, it can be seen that the invention is capable of producing high purity aluminum metal.

While the invention has been described in terms of preferred embodiments, the claims appended hereto are intended to encompass other embodiments which fall within the spirit of the invention.

Having thus described the invention and certain embodiments thereof, we claim:

1. A process for purifying aluminum alloy comprising:

(a) providing the aluminum alloy in a molten state in a container having a porous membrane therein, said porous membrane being capable of containing molten aluminum in the container and being permeable by a molten electrolyte; and (b) electrolytically transferring aluminum through said porous membrane to a cathode in the presence of the electrolyte, the transferring effected at a current density of greater than [200] *500* amps/ft$^2$ and characterized by depositing substantially all of the aluminum transferred through the porous membrane at the cathode, thereby substantially purifying said aluminum by separating it from its alloying constituents.

2. The process according to claim 1 wherein the porous membrane has a maximum average pore diameter of 635 microns.

3. The process according to claim 1 wherein porous carbon is employed as the porous membrane.

4. The process according to claim 3 wherein the porous carbon has an average pore diameter in the range of 5 to 425 microns.

5. The process according to claim 1 wherein said electrolyte employed comprises at least one salt selected from the group consisting of aluminum fluoride and aluminum chloride and at least one salt selected from the group consisting of sodium, potassium, lithium, manganese and magnesium halide.

6. The process according to claim 5 wherein said electrolyte employed comprises at least one salt selected from the group consisting of aluminum fluoride and aluminum chloride and at least one salt selected from the group consisting of sodium, potassium, lithium, manganese and magnesium chloride.

7. The process according to claim 1 wherein the electrolyte consists essentially of 5 to 95 wt. % LiCl, 4 to 70 wt. % KCl and 1 to 25 wt. % $AlF_3$.

8. The process according to claim 1 wherein the electrolyte has a temperature in the range of 675° to 925° C.

9. The process according to claim 1 wherein the aluminum is transferred at a current density of at least [300] *500* amps/ft$^2$.

10. The process according to claim 1 wherein the aluminum is transferred at a current density in the range of [300] *500* to 3000 amps/ft$^2$.

11. A process for purifying aluminum alloy comprising:

(a) providing the aluminum alloy in a container having a porous carbon membrane therein, said porous membrane having a maximum average pore diameter of 635 microns and being permeable by a molten electrolyte containing at least one salt selected from the group consisting of aluminum fluoride and aluminum chloride and at least one salt selected from the group consisting of sodium, potassium, lithium, manganese and magnesium halide; and (b) electrolytically transferring aluminum through said porous membrane to a cathode in the presence of the electrolyte at a temperature in the range of 675° to 925° C., the transferring being effected at a current density in the range of [300] *500* to 3000 amps/ft$^2$ and characterized by depositing substantially all of the aluminum transferred through the porous membrane at the cathode, thereby substantially purifying said aluminum by separating it from its alloying constituents.

* * * * *